United States Patent
Grossklaus, Jr. et al.

[11] Patent Number: 6,020,571
[45] Date of Patent: Feb. 1, 2000

[54] WELDING METHOD AND APPARATUS THEREFOR

[75] Inventors: Warren D. Grossklaus, Jr., West Chester; Richard R. Worthing, Jr., Cincinnati; Lawrence J. Roedl, West Chester, all of Ohio; John M. Powers, Independence, Ky.; Thomas F. Broderick, Springboro, Ohio

[73] Assignee: General Electric Company, Cincinnati, Ohio

[21] Appl. No.: 09/223,792

[22] Filed: Dec. 31, 1998

[51] Int. Cl.[7] .................................................... B23K 10/00
[52] U.S. Cl. ............................... 219/121.46; 219/121.45; 219/121.54; 219/121.59; 228/230
[58] Field of Search ....................... 219/121.59, 121.45, 219/137 R, 617, 608, 603, 667, 130.51, 130.4, 121.57, 121.46, 121.54; 228/230

[56] References Cited

U.S. PATENT DOCUMENTS

| | | | |
|---|---|---|---|
| 4,359,210 | 11/1982 | Peterson | 266/87 |
| 5,319,179 | 6/1994 | Joecks et al. | 219/137 |
| 5,464,958 | 11/1995 | Flowers et al. | 219/130.51 |
| 5,466,905 | 11/1995 | Flowers et al. | 219/121.46 |
| 5,708,253 | 1/1998 | Bloch et al. | 219/130.01 |

*Primary Examiner*—Mark Paschall
*Attorney, Agent, or Firm*—Andrew C. Hess; Gerry S. Gressel

[57] ABSTRACT

An apparatus and method for welding a superalloy article. The apparatus generally entails an enclosure adapted for containing a superalloy article, a polarity-reversing plasma transferred arc welder apparatus for welding a localized region of the article, an induction coil for heating the localized region, and elements for sensing and controlling the temperature of the localized region. The induction coil is placed in close proximity to the localized region of the article so that the temperature of the localized region is largely determined and quickly altered by the output of the coil. The polarity-reversing plasma transferred arc welding apparatus is operated at very low currents of not more than forty-five amps, so that the welding apparatus has only a secondary heating affect compared to the induction coil.

13 Claims, 1 Drawing Sheet

WELDING METHOD AND APPARATUS THEREFOR

FIELD OF THE INVENTION

This invention relates to welding apparatuses and methods. More particularly, this invention is directed to an apparatus and method for welding a superalloy article using a polarity-reversing plasma transferred arc technique that minimizes that area of the article that is heated during welding.

BACKGROUND OF THE INVENTION

High temperature cobalt and nickel-based superalloys are widely used to form certain components of gas turbine engines, including combustors and turbine vanes and blades. While high-temperature superalloy components are often formed by casting, circumstances exist where superalloy components are preferably or are required to be fabricated by welding. For example, components having complex configurations, such as turbine midframes and shroud support rings, can be more readily fabricated by welding separate castings together. Welding is also widely used as a method for restoring blade tips and for repairing cracks and other surface discontinuities in superalloy components caused by thermal cycling or foreign object impact. Because the cost of components formed from high-temperature cobalt and nickel-based superalloys is relatively high, restoring/repairing these components is typically more desirable than replacing them when they become worn or damaged.

In the past, superalloy components of gas turbine engines have been welded at an elevated temperature (e.g., in excess of about 1500° F. (about 815° C.)) to improve welding yields. Welding is often performed in an enclosure containing a controlled atmosphere (e.g., an inert gas) using such welding techniques as tungsten inert gas (TIG) and laser welding processes. Heating is typically performed by induction or with the use of lamps, such as quartz halogen lamps. Superalloy components of gas turbine engines are typically thermally stress-relieved before welding to relax residual stresses present from engine service, and then stress-relieved after welding to relax residual stresses induced during cool down from the welding operation. Heat treatment also provides stress relief by dissolution of a portion of hardening gamma prime ($\gamma'$) in $\gamma'$-strengthened nickel-base superalloys. Generally, the heat treatment and welding parameters will vary depending on the alloy of interest, the amount of residual stress relief and dissolution required, furnace design, component geometry and many other factors.

TIG and laser welding techniques as described above have been successfully practiced with superalloy components. With these techniques, though a general effort is made to limit heating to the area to be welded, a relatively large area of the component is often heated. As a general rule, excessively high welding temperatures must be avoided to prevent undesired recrystallization or melting of a component, while the minimum component temperature must be sufficiently high (e.g., 1500° F.) to inhibit cracking during welding. At such high temperatures, the heating and cooling cycles can be lengthy, and the comfort of the operator of the welding apparatus can be an issue.

BRIEF SUMMARY OF THE INVENTION

The present invention generally provides an apparatus and method for welding a superalloy article. More particularly, the apparatus and method of this invention provide for accurately controlling the temperature of a very localized region of an article so that an optimum temperature can be maintained in the localized region during welding to produce a small, controlled weldment and promote the desired physical and mechanical properties of the article.

The apparatus of this invention generally entails an enclosure adapted for containing a superalloy article, means for welding a localized region of the article, means for heating the localized region, means for sensing the temperature of the localized region, and means for controlling the output of the heating means based on the temperature of the localized region and according to a preestablished welding temperature profile. According to the invention, the heating means is an induction coil placed in close proximity to the localized region of the article, and the sensing means senses the temperature of the localized region so that the temperature of the localized region is largely determined and quickly altered by the output of the coil. Also according to the invention, the welding means is a polarity-reversing plasma transferred arc (PTA) welding apparatus that is operated at very low currents of not more than forty-five amps, preferably less than five amps, so that the welding apparatus has only a secondary heating affect compared to the induction coil. The apparatus also employs a memory storage device that stores an appropriate welding temperature profile for the localized region of the article.

The method enabled by the apparatus described above generally entails preestablishing the desired welding temperature profile for the superalloy article, and then operating the induction coil and the sensing and controlling means to heat the localized region of the article according to the welding temperature profile. The localized region of the article is then welded by polarity-reversing PTA welding at a low current while maintaining the temperature of the localized region according to the welding temperature profile.

As described above, the apparatus and method of this invention couple induction heating with a low-heat polarity-reversing PTA welding process to enable accurate control of the temperature of an extremely localized region of a superalloy article during fabrication, restoration or repair. As a result, the temperature of the localized region can be more accurately maintained within a limited temperature range throughout the welding operation that avoids thermal damage to the article. Additional advantages of this invention include a reduced welding time, lower heat input that reduces substrate and weldment cracking, low power usage, and the ability to produce a near-net shape weld buildup with little or no subsequent weldment profiling needed.

Other objects and advantages of this invention will be better appreciated from the following detailed description.

DETAILED DESCRIPTION OF THE INVENTION

Figure 1:
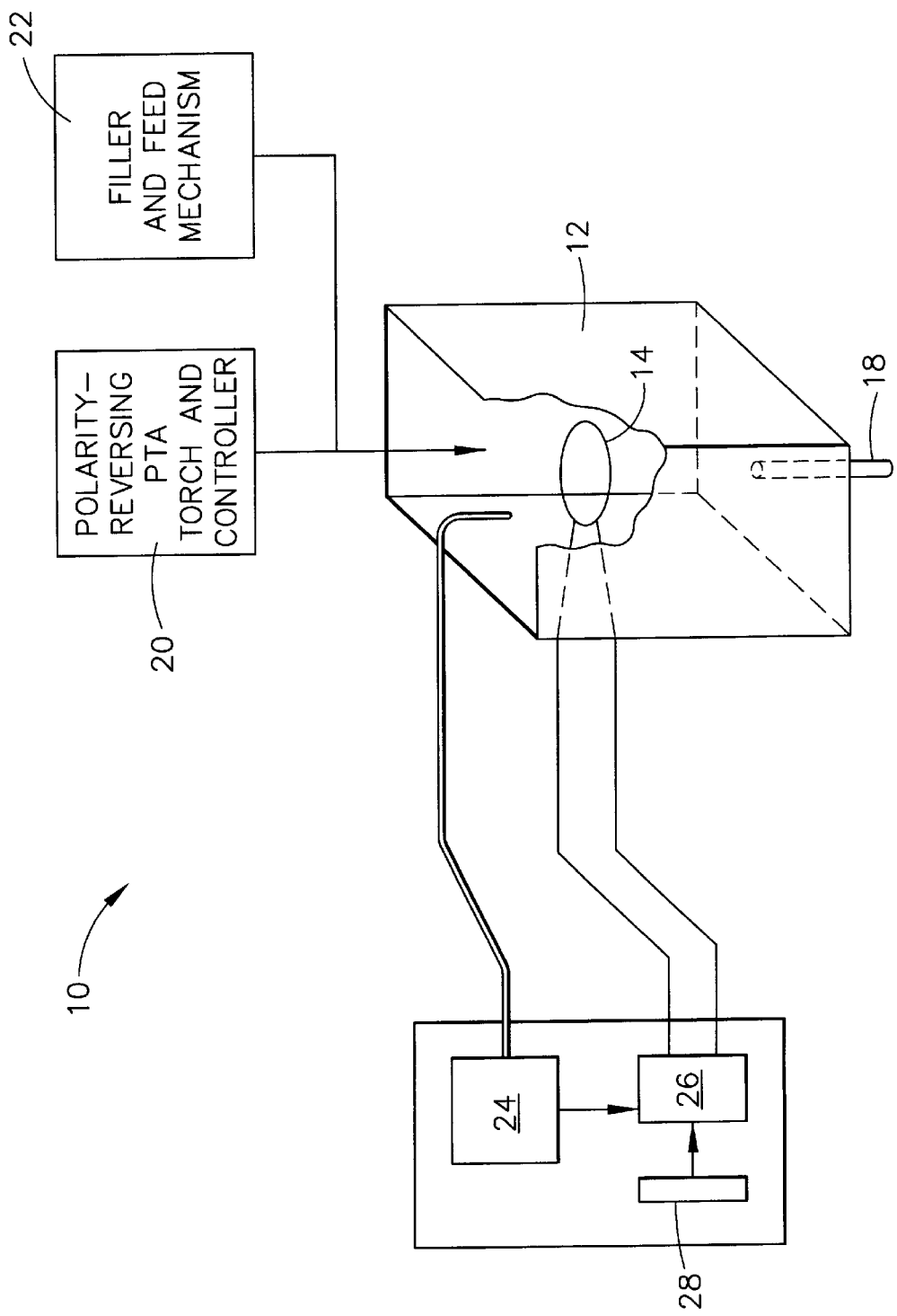
FIG. 1 is a schematic representation of a welding apparatus in accordance with this invention.

The present invention is generally directed to superalloy articles that undergo a welding operation during their fabrication, restoration or repair. While the advantages of this invention are described with reference to components of gas turbine engines, the invention is also applicable to a variety of applications in which the temperature of an article must be accurately maintained during welding.

An apparatus 10 for performing a welding operation according to this invention is schematically depicted in FIG. 1. The apparatus 10 includes an enclosure 12 generally of a type known for performing a welding operation such as TIG or laser welding in a controlled atmosphere. Schematically represented within the apparatus 10 is an induction coil 14 for heating a superalloy article (not shown). The coil 14 is preferably sized and shaped to closely surround a very localized region of the article so that uniform and rapid heating of the localized region occurs. The enclosure 12 is shown as including an inlet 18 through which an inert gas such as argon is fed to the interior of the enclosure 12 to prevent oxidation of the superalloy article while at the elevated processing temperatures required by the welding operation.

In the past, welding operations performed within an enclosure of the type shown in FIG. 1 involved heating an article to an elevated temperature, typically in excess of about 1500° F. (about 815° C.) but less than the recrystallization temperature of the article, while monitoring the bulk temperature of the article. The heating rate was generally dependent on the type of heating element used and the size of the enclosure and article being heated. Once the weld temperature was attained, welding by TIG or laser was initiated, with any additional heating occurring if a sufficient temperature drop occurred.

In contrast, the welding apparatus 10 of this invention enables accurate control of the temperature profile of an extremely localized region of an article undergoing a welding operation within the enclosure 12, and therefore offers the opportunity to perform a more rapid welding operation while improving temperature control of the article. These advantages are achieved in part by detecting the temperature of the localized region of the article with a suitable temperature sensor 24, such as an optical pyrometer or a standard-type K thermocouple. The temperature signal from the sensor 24 is used as input to a programmable temperature controller 26, which compares the signal from the sensor 24 to the desired welding temperature profile stored in memory 28 for the article. Power to the induction coil 14 is then regulated based on the difference between the desired temperature profile and the current temperature of the localized region. In this manner, essentially any welding temperature profile required for a given superalloy and article can be programmed and accurately controlled to achieve the objects of this invention.

According to this invention, welding is performed with a polarity-reversing plasma transferred arc (PTA) welder 20 operated at very low currents, preferably at least 0.1 amp but not more than forty-five amps, and preferably less than five amps. At such low current levels, little heating of the article occurs as a result of the welding operation itself. Instead, the temperature of the localized region of the article is primarily determined by the induction coil 14, whose output is accurately controlled as described above. Polarity-reversing PTA welding is described in U.S. Pat. No. 5,466,905 to Flowers et al., which is assigned to the assignee of this invention and incorporated herein by reference. As taught by Flowers et al., polarity-reversing PTA welding involves generating an electric arc with a direct electric current between a pair of electrodes, transferring the electric arc with an inert plasma gas (e.g., argon) to the article so that a plasma arc is established between the article and one of the electrodes, and then reversing the polarities of the article and electrode at a low frequency. In practice, the polarity cycle parameters disclosed by Flowers et al. are preferred for use with this invention—generally, polarity reversal at a frequency of about 1 to 1000 Hz, during which the polarity of the article during each cycle is positive for a shorter time than it is negative. A filler material is then fed into the plasma arc by any suitable means 22. The filler material may be in the form of a superalloy wire or powder whose composition is metallurgically compatible with that of the article and appropriate for the operating environment of the article.

While discussed in terms of processing superalloy articles, the apparatus 10 of this invention could also be employed for the treatment and welding of other materials and articles whose processing requires accurate control at elevated temperatures to avoid degradation of the article properties. Therefore, while the invention has been described in terms of a preferred embodiment, it is apparent that other forms could be adopted by one skilled in the art. Accordingly, the scope of the invention is to be limited only by the following claims.

What is claimed is:

1. A method of welding a superalloy article, the method comprising the steps of:

establishing a welding temperature profile for a superalloy article;

placing the superalloy article in an enclosure so that a localized region of the article is adjacent to an induction coil within the enclosure, the enclosure further having means for sensing a temperature of the localized region and means for controlling heat output of the induction coil based on the temperature of the localized region and according to the welding temperature profile;

operating the induction coil, the sensing means and the controlling means to heat the localized region of the article with the induction coil according to the welding temperature profile; and then welding the localized region of the article by polarity-reversing plasma transferred arc welding at a current of 0.1 to about 45 amps while maintaining the temperature of the localized region with the induction coil according to the welding temperature profile, the induction coil having a greater heating effect on the localized region than the polarity-reversing plasma transferred arc welding.

2. A method as recited in claim 1, wherein the welding step entails establishing the article at a first polarity and establishing an electrode adjacent to the article at an opposite polarity, and then repeatedly reversing the polarities of the article and the electrode.

3. A method as recited in claim 2, wherein the welding step entails supplying a filler material to a plasma arc generated between the electrode and the article.

4. A method as recited in claim 3, wherein the filler material is a material selected from the group consisting of superalloy wires and powders.

5. A method as recited in claim 1, wherein the temperature of the localized region of the article is sensed with an optical pyrometer.

6. A method as recited in claim 1, wherein the welding step is performed with a current of 0.1 to less than 5 amps.

7. A method of welding a superalloy article, the method comprising the steps of:

establishing a welding temperature profile for a superalloy article;

placing the superalloy article in an enclosure so that a localized region of the article is adjacent to an induction coil within the enclosure, the enclosure having means for sensing a temperature of the localized region and means for controlling heat output of the induction coil based on the temperature of the localized region and according to the welding temperature profile;

operating the induction coil, the sensing means and the controlling means to heat the localized region of the article with the induction coil according to the welding temperature profile;

while maintaining the temperature of the localized region with the induction coil according to the welding temperature profile, establishing the article at a first polarity and establishing an electrode adjacent the article at an opposite polarity so as to initiate welding of the article through a plasma arc generated between the article and the electrode at a current of 0.1 to less than 5 amps, the induction coil having a greater heating effect on the localized region than welding with the plasma arc;

supplying a filler material to the plasma arc generated between the electrode and the article; and then repeatedly reversing the polarities of the article and the electrode while maintaining the temperature of the localized region with the induction coil according to the welding temperature profile.

8. A welding apparatus comprising:

an enclosure containing a superalloy article;

an induction coil heating only a localized region of the article within the enclosure;

means for sensing a temperature of the localized region of the article;

memory means for storing a welding temperature profile of the article;

means for controlling the induction coil based on the temperature of the localized region according to the welding temperature profile; and means for welding the localized region by polarity-reversing plasma transferred arc welding at a current of less than 5 amps while maintaining the temperature of the localized region with the induction coil according to the welding temperature profile, the induction coil having a greater heating effect on the localized region than the polarity-reversing plasma transferred arc welding.

9. A welding apparatus as recited in claim 8, wherein the welding means comprises means for establishing the article at a first polarity and establishing an electrode adjacent the article at an opposite polarity, and means for repeatedly reversing the polarities of the article and the electrode.

10. A welding apparatus as recited in claim 9, wherein the welding means comprises means for supplying a filler material to a plasma arc generated between the electrode and the article.

11. A welding apparatus as recited in claim 10, wherein the filler material is a material selected from the group consisting of superalloy wires and powders.

12. A welding apparatus as recited in claim 8, wherein the sensing means is an optical pyrometer.

13. A welding apparatus as recited in claim 8, wherein the welding means operates at a current of 0.1 to less than 5 amps.

* * * * *